United States Patent
Kawai et al.

(10) Patent No.: US 9,379,595 B2
(45) Date of Patent: Jun. 28, 2016

(54) ROTATING ELECTRICAL MACHINE

(71) Applicant: HONDA MOTOR CO., LTD., Tokyo (JP)

(72) Inventors: Norikazu Kawai, Wako (JP); Shinji Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 285 days.

(21) Appl. No.: 14/243,892

(22) Filed: Apr. 3, 2014

(65) Prior Publication Data

US 2014/0300222 A1    Oct. 9, 2014

(30) Foreign Application Priority Data

Apr. 8, 2013    (JP) .................................. 2013-080499

(51) Int. Cl.
| | |
|---|---|
| *H02K 9/00* | (2006.01) |
| *H02K 9/26* | (2006.01) |
| *H02K 9/19* | (2006.01) |
| *H02K 7/116* | (2006.01) |

(52) U.S. Cl.
CPC .. *H02K 9/26* (2013.01); *H02K 9/19* (2013.01); *H02K 7/116* (2013.01)

(58) Field of Classification Search
CPC .............. H02K 9/26; H02K 9/16; H02K 9/19
USPC ......................................... 310/52, 54, 58, 64
See application file for complete search history.

(56) References Cited

U.S. PATENT DOCUMENTS

| | | | | |
|---|---|---|---|---|
| 5,682,074 | A * | 10/1997 | Di Pietro ........... | B22D 19/0054 310/211 |
| 8,487,489 | B2 * | 7/2013 | Palafox ................... | H02K 3/24 310/52 |
| 2013/0169073 | A1 * | 7/2013 | Nagahama ............... | H02K 9/19 310/43 |
| 2013/0270938 | A1 * | 10/2013 | Matsuda .................. | B60K 1/00 310/54 |
| 2014/0125162 | A1 * | 5/2014 | Tsuchie ................. | H02K 9/193 310/54 |
| 2014/0217842 | A1 * | 8/2014 | Kikuchi ................... | H02K 9/19 310/54 |

FOREIGN PATENT DOCUMENTS

WO    WO 2012/046307    4/2012

* cited by examiner

*Primary Examiner* — Hanh Nguyen
(74) *Attorney, Agent, or Firm* — Mori & Ward, LLP

(57) ABSTRACT

A rotating electrical machine includes an annular stator, a plurality of coils, a case, a side cover, a refrigerant passage, supply ports, and a strainer. The annular stator has an axis. The plurality of coils are provided about the axis. The case houses the stator. The side cover is disposed at one axial end of the case so as to face the stator in an axial direction along the axis. The refrigerant passage is provided in the side cover along a circumferential direction. The supply ports supply refrigerant from the refrigerant passage toward axial ends of the plurality of coils. The strainer is provided inside the refrigerant passage to be erected so as to intersect with the axis. The strainer has a plate-shaped member including holes to trap foreign matter in the refrigerant while the refrigerant passes through the holes.

7 Claims, 5 Drawing Sheets

ROTATING ELECTRICAL MACHINE

CROSS-REFERENCE TO RELATED APPLICATIONS

The present application claims priority under 35 U.S.C. §119 to Japanese Patent Application No. 2013-080499, filed Apr. 8, 2013, entitled "Rotating Electrical Machine." The contents of this application are incorporated herein by reference in their entirety.

BACKGROUND

1. Field

The present disclosure relates to a rotating electrical machine.

2. Description of the Related Art

Hitherto, in a rotating electrical machine used in an electric vehicle or the like, in order to suppress output drop due to temperature rise, refrigerant is supplied so that it operates at or below a predetermined temperature, and heat generation during power running and regenerative running of the rotating electrical machine is suppressed. At this time, it is common practice to circulate lubricating oil of a transmission with an oil pump and to spray the lubricating oil on the rotating electrical machine.

International Publication No. WO 2012/046307 describes circulating lubricating oil filling a case to such a height that part of gear housed in the case is immersed, through a strainer disposed in the bottom of the case, and spraying the lubricating oil pumped by an oil pump on a rotating electrical machine and gear. The strainer collects foreign matter such as iron scrap in the lubricating oil, and prevents possible trouble caused by the fact that iron scrap or the like is attached to the rotating electrical machine or caught in the gear.

SUMMARY

According to one aspect of the present invention, a rotating electrical machine includes an annular stator, a plurality of coils, a case, a side cover, a refrigerant passage, supply ports, and a strainer. The annular stator has an axis. The plurality of coils are provided about the axis. The case houses the stator. The side cover is disposed at one axial end of the case so as to face the stator in an axial direction along the axis. The refrigerant passage is provided in the side cover along a circumferential direction. The supply ports supply refrigerant from the refrigerant passage toward axial ends of the plurality of coils. The strainer is provided inside the refrigerant passage to be erected so as to intersect with the axis. The strainer has a plate-shaped member including holes to trap foreign matter in the refrigerant while the refrigerant passes through the holes.

According to another aspect of the present invention, a rotating electrical machine includes an annular stator, a plurality of coils, a case, a side cover, a refrigerant passage, supply ports, and a strainer. The annular stator has a rotational axis. The plurality of coils are provided about the rotational axis. The case surrounds the annular stator around the rotational axis and has a side opening at one end of the case in the rotational axis. The side cover is provided to cover the side opening to face the plurality of coils. The refrigerant passage is provided in the side cover along a circumferential direction of the annular stator. The supply ports supply refrigerant from the refrigerant passage toward the plurality of coils. The strainer is provided inside the refrigerant passage to be erected so as to intersect with the rotational axis. The strainer has a plate-shaped member including holes to trap foreign matter in the refrigerant while the refrigerant passes through the holes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
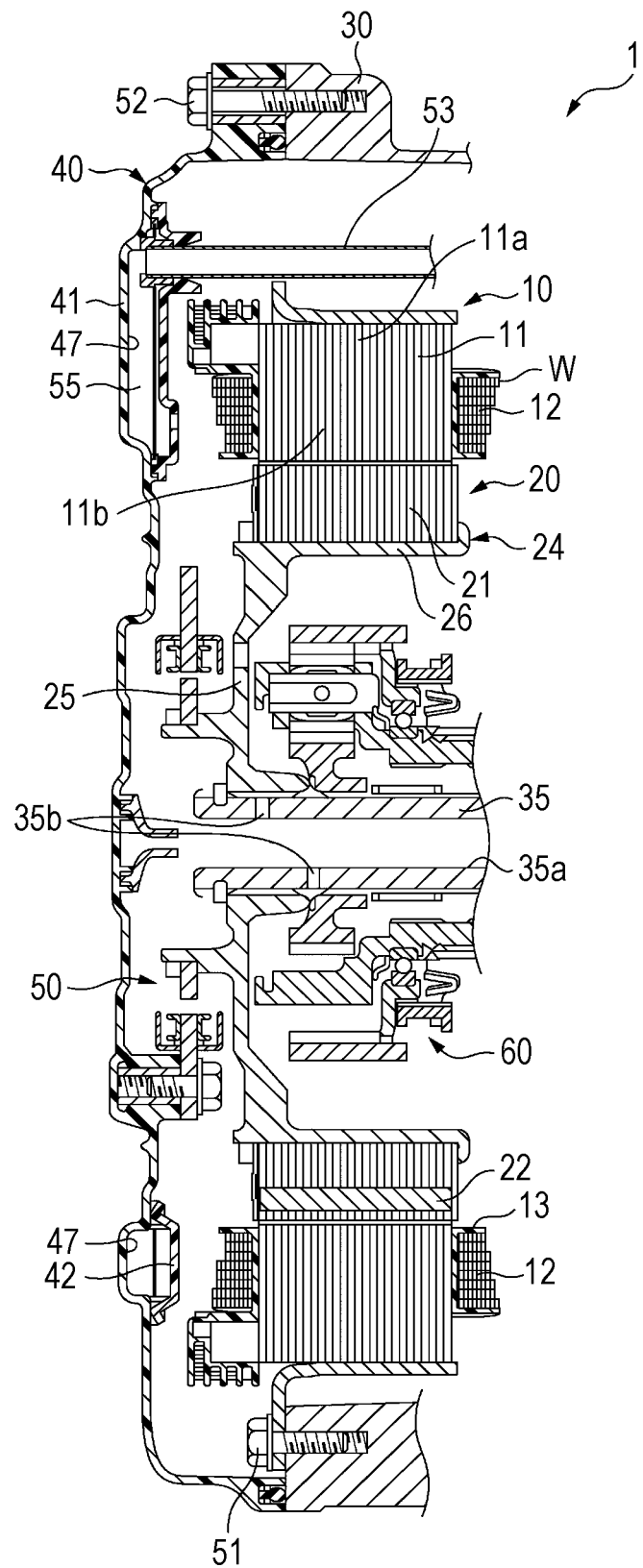
FIG. 1 is a sectional view of a rotating electrical machine of an embodiment of the present disclosure.

The embodiments will now be described with reference to the accompanying drawings, wherein like reference numerals designate corresponding or identical elements throughout the various drawings.

A rotating electrical machine of an embodiment of the present disclosure will be described with reference to the drawings below. As shown in FIG. 1, the rotating electrical machine 1 of this embodiment includes a stator 10, an annular rotor 20 that is disposed on the radially inner side of the stator 10 so as to face the stator 10 with a slight gap therebetween, a case 30 that houses the stator 10 and the rotor 20, and a side cover 40 that is disposed at one axial end of the case 30 so as to face the stator 10 in the axial direction.

The case 30 that houses the stator 10 and the rotor 20 therein is made of an electrically conductive metal (for example, iron), and has a substantially cylindrical shape. The case 30 holds the stator 10 with a plurality of bolts 51 (only one of them is shown in FIG. 1), and rotatably holds a main shaft 35, with a bearing (not shown) therebetween, concentrically with the rotating electrical machine 1.

The stator 10 includes an annular stator core 11 and a plurality of coils 12. The stator core 11 is configured by stacking a plurality of magnetic steel sheets in the axial direction, and has an annular supporting portion 11a and a plurality of teeth 11b formed so as to protrude radially inward from the annular supporting portion 11a. Each coil 12 is formed by winding wire W around a corresponding one of the teeth 11b of the stator core 11 with an insulator 13 therebetween, the insulator 13 being formed of synthetic resin having insulating characteristics. Therefore, the plurality of coils 12 are arranged substantially annularly about the axis of the rotating electrical machine 1.

The rotor 20 has a substantially annular rotor yoke 21, permanent magnets 22 fixed to the outer periphery of the rotor yoke 21, and a rimmed disk-like rotor cup 24 that holds the rotor yoke 21 on the radially outer side thereof and that is fixed to the main shaft 35.

The rotor yoke 21 is configured by stacking, in the axial direction, a plurality of annular magnetic steel sheets made of a magnetically permeable material, and the inner peripheral surface of the rotor yoke 21 is press-fitted and fixed to the outer peripheral surface of the rotor cup 24. The plurality of permanent magnets 22 are provided alternately in the circumferential direction such that magnetic poles adjacent in the circumferential direction are different in polarity.

The rotor cup 24 has a rimmed disk shape, and includes a substantially disk-shaped bottom portion 25 located at one axial end, and a rim portion 26 extending from the outer periphery of the bottom portion 25 toward the other axial end. The rim portion 26 forms the outer peripheral surface of the rotor cup 24, and the rotor yoke 21 is press-fitted on the rim portion 26. The inner periphery of the bottom portion 25 is connected to the main shaft 35. In FIG. 1, reference numeral 50 denotes a resolver that detects the rotation state of the rotor 20.

The main shaft 35 is provided with a planetary gear type speed reducer 60 that is provided adjacent to the rotor cup 24 and on the inner side of the rotor 20. The main shaft 35 has a hollow cylindrical shape, and is therein provided with an axial oil passage 35a, and a plurality of radial oil passages 35b that supply the planetary gear type speed reducer 60 with oil.

Figure 3:
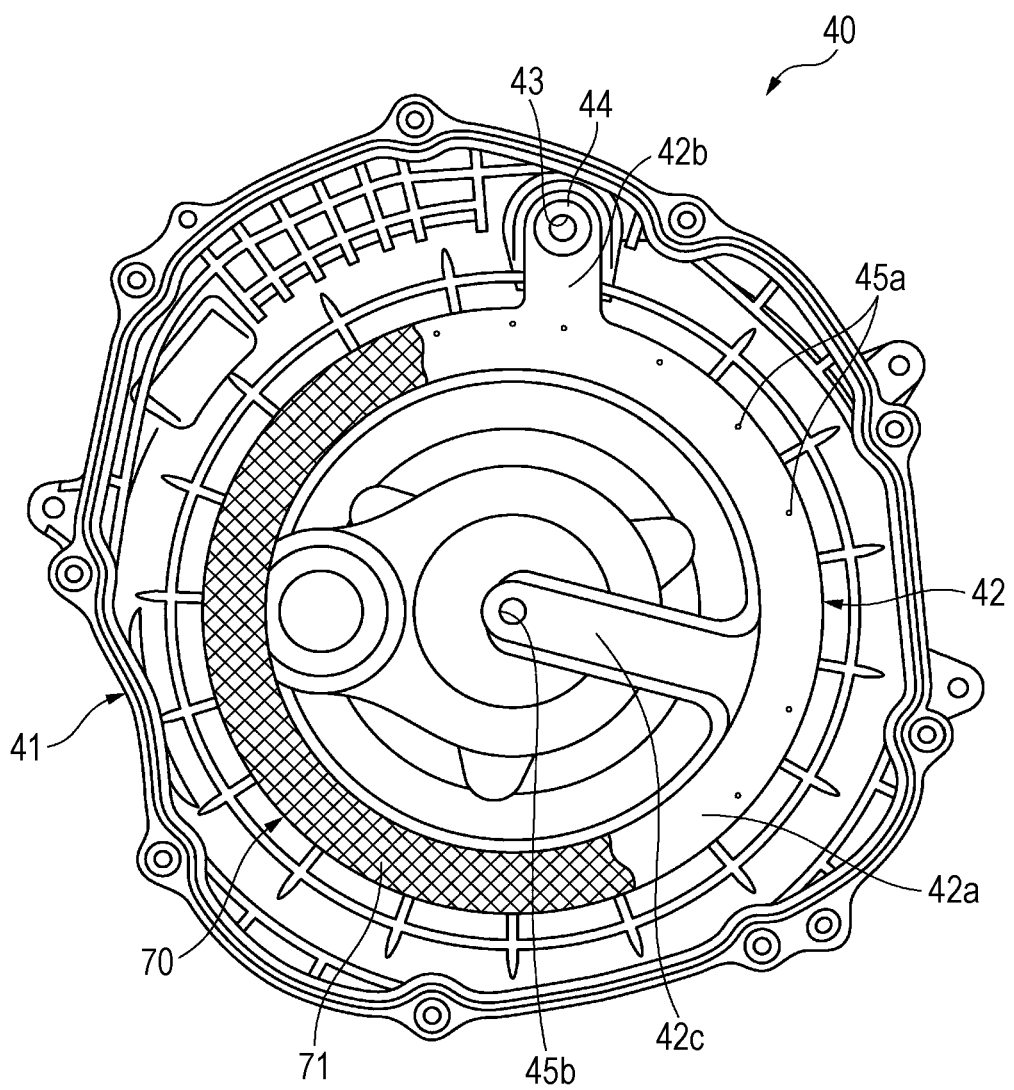
FIG. 3 is a plan view of a side cover, the view being taken from the inner side.
Figure 4A:
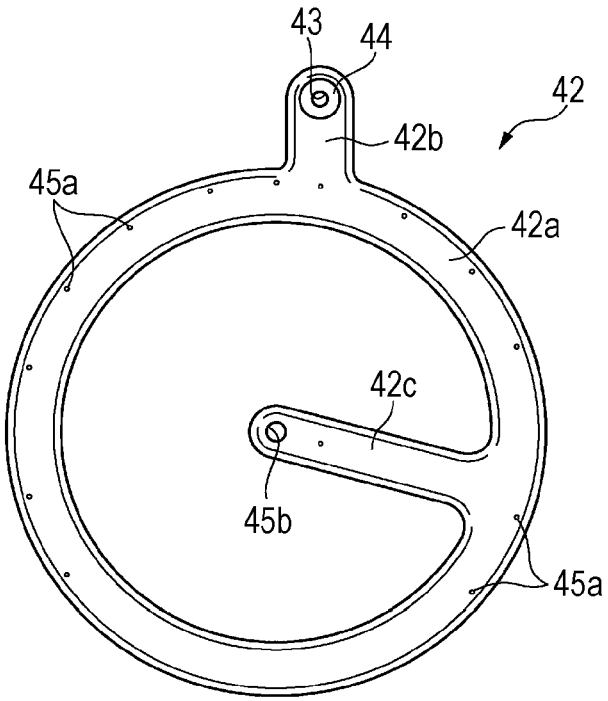
FIG. 4A is a plan view of a passage cover.

The side cover 40 has, as also shown in FIG. 3, a cover main body 41 and a passage cover 42 both made of resin. The cover main body 41 is attached to the case 30 with a plurality of bolts 52 (only one of them is shown in FIG. 1), and seals the inside of the case from the outside. The passage cover 42 is fixed to the cover main body 41 from the inner side by vibration welding or the like. The passage cover 42 has, as shown in FIG. 4A, an annular portion 42a formed in a substantially annular shape, an inlet portion 42b extending radially outward from the annular portion 42a, and an outlet portion 42c extending radially inward to substantially the center of the annular portion 42a from a circumferential position different from that of the inlet portion 42b. At least part of the annular portion 42a overlaps the coils 12 wound on the insulators 13, and the annular portion 42a is provided with a plurality of oil supply ports 45a that are arranged in the circumferential direction and at circumferential positions where the oil supply ports 45a face the coils 12 in the axial direction. The radially lower region of the annular portion 42a where no oil supply ports 45a are provided is a part corresponding to an oil storage portion located at the bottom of the case 30.

From the radially outer end of the inlet portion 42b, a protruding portion 44 in which an opening 43 is formed protrudes inward in the axial direction. An oil supply pipe 53 that is connected to an oil pump (not shown) and that is made of an electrically conductive metal (for example, iron) is inserted into the opening 43. From the radially inner end of the outlet portion 42c corresponding to substantially the center of the annular portion 42a, an oil supply port 45b protrudes inward in the axial direction.

In a part of the cover main body 41 facing the passage cover 42, a recessed groove 47 is formed so as to recess mainly from the inner side toward the outer side, and a refrigerant passage 55 is formed between the recessed groove 47 of the cover main body 41 and the passage cover 42. Oil is supplied to the refrigerant passage 55 from the oil supply pipe 53, and as indicated by arrows of FIG. 2, oil is supplied from the oil supply ports 45a to the coils 12. Oil is also supplied from the oil supply port 45b through the main shaft 35, the axial oil passage 35a, and the radial oil passages 35b to the planetary gear type speed reducer 60.

A plate-like strainer 70 is provided inside the refrigerant passage 55. Oil introduced from the oil supply pipe 53 and discharged to the oil supply ports 45a and 45b passes through the strainer 70, and foreign matter such as iron scrap in oil is thereby collected.

Figure 4B:
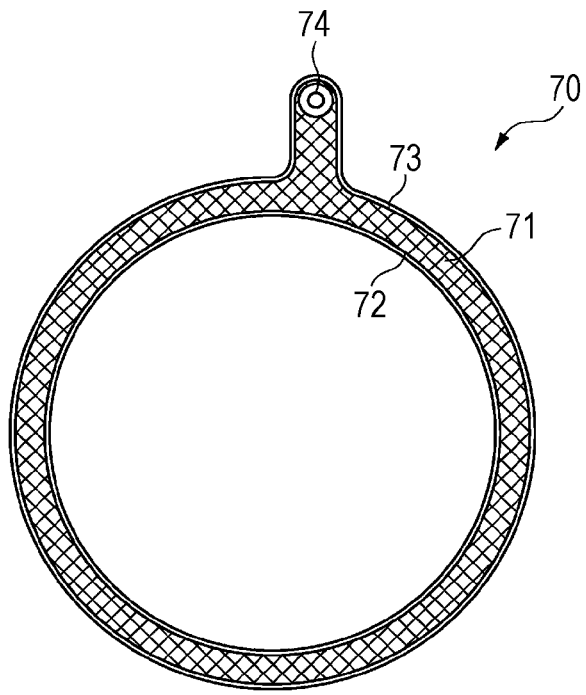
FIG. 4B is a plan view of a strainer.

The strainer 70 has, as shown in FIG. 4B, a strainer main body 71 that has a shape reflecting the passage cover 42 from which the outlet portion 42c is removed, that is, the annular portion 42a and the inlet portion 42b of the passage cover 42, frame portions 72 and 73 that are located on the inner peripheral edge and outer peripheral edge of the strainer main body 71, and a tubular collar 74 that is provided at a position corresponding to the protruding portion 44 of the passage cover 42 and that is fitted (for example, spigot-fitted) to the oil supply pipe 53.

The strainer main body 71 is a plate-like member that is made of an electrically conductive metal (for example, iron) and in which holes are formed that can trap foreign matter in oil, for example, a mesh made by crossing a plurality of wires, or a punching board made by forming a plurality of small holes in a plate material. As with the strainer main body 71, the frame portions 72 and 73 and the collar 74 are also made of an electrically conductive metal (for example, iron). The oil supply pipe 53 is inserted into the opening 43 of the passage cover 42 and is fitted in the collar 74, and the end of the oil supply pipe 53 is thereby located in the refrigerant passage 55. The strainer main body 71 is electrically connected through the collar 74 to the oil supply pipe 53. The oil supply pipe 53 is electrically connected to the case 30. The strainer 70 is thereby electrically connected to the case 30 through the oil supply pipe 53.

Figure 5:
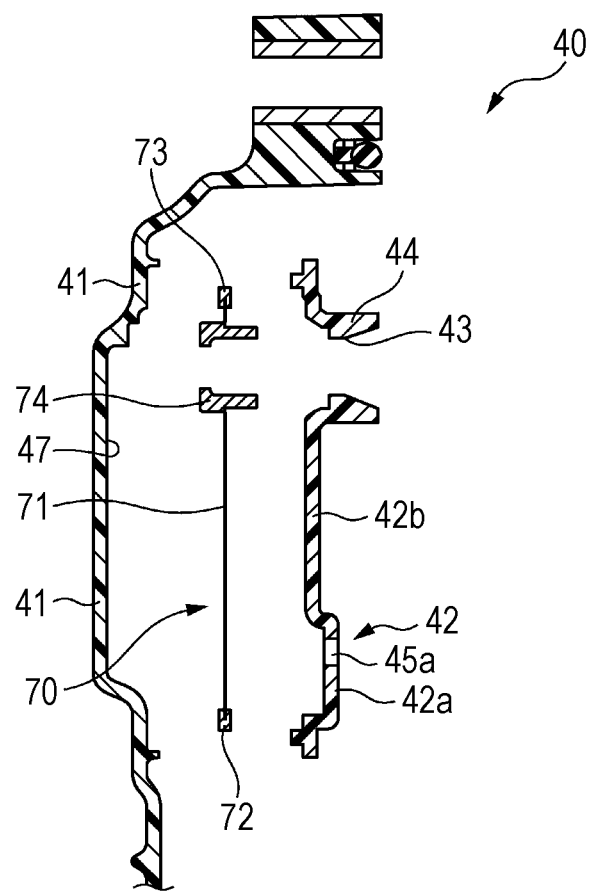
FIG. 5 is an exploded view illustrating the assembling of the side cover.

The side cover 40 configured as described above is formed, as shown in FIG. 5, by sandwiching the strainer 70 between the cover main body 41 and the passage cover 42 and joining them together by vibration welding or the like. At this time, the collar 74 of the strainer 70 is positioned by the protruding portion 44 of the passage cover 42. The refrigerant passage 55 is thereby formed between the recessed groove 47 of the cover main body 41 and the passage cover 42. Inside the refrigerant passage 55, the strainer 70 is erected substantially perpendicularly to the axial direction, and is disposed so as to extend along the circumferential direction at a radial position where the strainer 70 faces the coils 12 in the axial direction.

Figure 2:
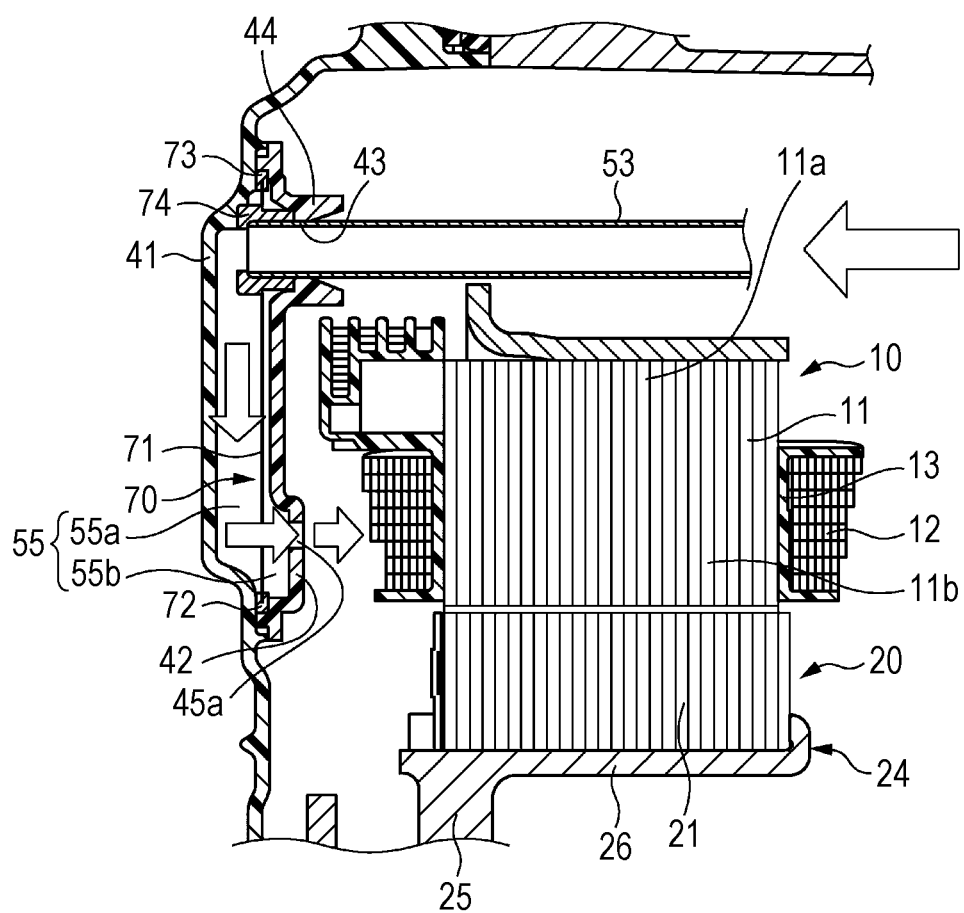
FIG. 2 is an enlarged view of the main part of FIG. 1.

As shown in FIG. 2, the refrigerant passage 55 is divided into an upstream refrigerant passage 55a on the upstream side of the strainer 70, and a downstream refrigerant passage 55b on the downstream side of the strainer 70. Part of the refrigerant passage 55 formed by part of the recessed groove 47 of the cover main body 41 and the outlet portion 42c of the passage cover 42 includes only the downstream refrigerant passage 55b continuous with the downstream refrigerant passage 55b of the annular portion 42a owing to the shape of the cover main body 41. Therefore, oil supplied from the oil supply pipe 53 flows from the upstream refrigerant passage 55a through the strainer 70 to the downstream refrigerant passage 55b. Part of the oil is supplied from the oil supply ports 45a to the coils 12, and the rest of the oil is supplied from the oil supply port 45b through the main shaft 35, the axial oil passage 35a, and the radial oil passages 35b to the planetary gear type speed reducer 60. At this time, foreign matter such as iron scrap in oil is collected by the strainer 70.

As described above, according to the rotating electrical machine 1 of this embodiment, a strainer 70 that is a plate-like member such as a mesh can be built in the refrigerant passage 55 of the side cover 40, and the need to provide a space for disposing a strainer 70 in the lower part of the case is eliminated. Hitherto, a strainer is placed in the lower part of the case, and the degree of freedom of layout in the case is thereby limited. By building a strainer 70 in the side cover 40, the reduction in the degree of freedom of layout in the case 30 can be suppressed. Since the refrigerant passage 55 is formed along the circumferential direction, the area of the strainer 70 can be secured, and foreign matter can be removed effectively. By securing the area of the strainer 70, replacement of the strainer is made unnecessary.

Since the side cover 40 is made of resin, electromagnetic waves radiated when alternating current flows through the coils are easily transmitted through the side cover 40, and the transmitted electromagnetic waves may act as radio noise. However, since the strainer 70 made of metal is formed in an annular shape so as to extend along the circumferential direction at a radial position where the strainer 70 faces the coils 12 in the axial direction, electromagnetic waves can be blocked effectively, and electromagnetic waves can be prevented from being transmitted through the side cover 40. The electromagnetic waves radiated from the coils 12 have a relatively low frequency and a long wavelength, and therefore even if the strainer 70 is a plate-like member in which small holes are formed, the electromagnetic waves can be blocked effectively. The strainer 70 does not necessarily have to be formed in an annular shape, and may be formed, for example, in a circular arc shape like a ring from which a lower part is removed.

The refrigerant passage 55 is formed between the cover main body 41 and the passage cover 42 by welding the cover main body 41 and the passage cover 42 both made of resin together, and the strainer 70 made of metal is sandwiched between the cover main body 41 and the passage cover 42. Therefore, when forming the refrigerant passage 55, the strainer 70 can be easily fixed inside the refrigerant passage 55.

Since part of the oil supply pipe 53 is located inside the refrigerant passage 55 and is electrically connected to the strainer 70, the strainer 70 need not be in direct contact with the case 30, and can be electrically connected through the oil supply pipe 53 to the case 30. The strainer 70 can thereby be easily brought to the ground potential, electromagnetic waves can be blocked effectively, and electromagnetic waves can be prevented from being transmitted through the side cover 40.

The present disclosure is not limited to the above-described embodiment, and various changes and modifications may be made therein. For example, although, in the above-described embodiment, the strainer 70 is made of metal and also functions as an electromagnetic wave barrier, the side cover 40 may be made of metal, or an electromagnetic wave barrier may be separately provided to the side cover 40 made of resin. The present disclosure may be applied not only to an inner rotor type rotating electrical machine but also to an outer rotor type rotating electrical machine.

In an aspect of an embodiment of the disclosure, a rotating electrical machine (for example, a rotating electrical machine 1 of the embodiment described above) includes an annular stator (for example, a stator 10 of the embodiment described above) about the axis of which a plurality of coils (for example, coils 12 of the embodiment described above) are disposed, a case (for example, a case 30 of the embodiment described above) that houses the stator, and a side cover (for example, a side cover 40 of the embodiment described above) that is disposed at one axial end of the case so as to face the stator in the axial direction. The side cover has a refrigerant passage (for example, a refrigerant passage 55 of the embodiment described above) formed along the circumferential direction, and supply ports (for example, oil supply ports 45a of the embodiment described above) capable of supplying refrigerant from the refrigerant passage toward axial ends of the coils. Inside the refrigerant passage, a strainer (for example, a strainer 70 of the embodiment described above) is erected so as to intersect with the axial direction, the strainer being a plate-like member in which holes are formed, the holes allowing passage of the refrigerant and being capable of trapping foreign matter in the refrigerant.

According to this configuration, a strainer that is a plate-like member can be built in the refrigerant passage of the side cover, and the need to provide a space for disposing a strainer in the lower part of the case is eliminated. Therefore, the reduction in the degree of freedom of layout in the case can be suppressed. Since the refrigerant passage is formed along the circumferential direction, the area of the plate-like member can secured, and foreign matter can be removed effectively.

It is preferable that the stator include a stator core (for example, a stator core 11 of the embodiment described above) having an annular supporting portion (for example, a supporting portion 11a of the embodiment described above) and a plurality of teeth (for example, teeth 11b of the embodiment described above) radially protruding from the supporting portion at predetermined intervals in the circumferential direction, and the plurality of coils formed by winding wire (for example, wire W of the embodiment described above) around the respective teeth, that the side cover be made of resin, and that the plate-like member be made of metal, and be formed in a circular arc shape or an annular shape so as to extend along the circumferential direction at a radial position where the plate-like member faces the plurality of coils in the axial direction.

When the side cover is made of resin, electromagnetic waves radiated when alternating current flows through the coils are easily transmitted through the side cover, and the transmitted electromagnetic waves may act as radio noise. However, since the plate-like member made of metal is formed in a circular arc shape or an annular shape so as to extend along the circumferential direction at a radial position where the plate-like member faces the coils in the axial direction, electromagnetic waves can be blocked effectively, and electromagnetic waves can be prevented from being transmitted through the side cover.

It is preferable that the side cover have a cover main body (for example, a cover main body 41 of the embodiment described above) and a passage cover (for example, a passage cover 42 of the embodiment described above) both made of resin, that the refrigerant passage be formed between the cover main body and the passage cover by welding the cover main body and the passage cover together, and that the plate-like member be made of metal, and be sandwiched between the cover main body and the passage cover.

According to this configuration, when forming the refrigerant passage, the plate-like member can be easily fixed inside the refrigerant passage.

It is preferable that the refrigerant passage be supplied with the refrigerant from an electrically conductive supply pipe, that part of the supply pipe be located inside the refrigerant passage and be electrically connected to the plate-like member, and that the supply pipe be electrically connected to the case.

According to this configuration, since part of the supply pipe is located inside the refrigerant passage and is electrically connected to the plate-like member, the plate-like member can be easily brought to the ground potential, electromagnetic waves can be blocked effectively, and electromagnetic waves can be prevented from being transmitted through the side cover.

Obviously, numerous modifications and variations of the present invention are possible in light of the above teachings. It is therefore to be understood that within the scope of the appended claims, the invention may be practiced otherwise than as specifically described herein.

What is claimed is:

1. A rotating electrical machine comprising:
   an annular stator having an axis;
   a plurality of coils provided about the axis;
   a case that houses the stator;
   a side cover disposed at one axial end of the case so as to face the stator in an axial direction along the axis;
   a refrigerant passage provided in the side cover along a circumferential direction;
   supply ports to supply refrigerant from the refrigerant passage toward axial ends of the plurality of coils; and
   a strainer provided inside the refrigerant passage to be erected so as to intersect with the axis, the strainer having a plate-shaped member including holes to trap foreign matter in the refrigerant while the refrigerant passes through the holes.

2. The rotating electrical machine according to claim 1,
   wherein the annular stator includes a stator core having an annular supporting portion and a plurality of teeth radially protruding from the annular supporting portion at predetermined intervals in the circumferential direction, and the plurality of coils provided by winding wire around each of the plurality of teeth,
   wherein the side cover is made of resin, and
   wherein the plate-shaped member is made of metal, and is provided in a circular arc shape or an annular shape so as to extend along the circumferential direction at a radial position where the plate-shaped member faces the plurality of coils in the axial direction.

3. The rotating electrical machine according to claim 2,
   wherein the refrigerant passage is supplied with the refrigerant from an electrically conductive supply pipe,
   wherein part of the electrically conductive supply pipe is located inside the refrigerant passage and is electrically connected to the plate-shaped member, and
   wherein the electrically conductive supply pipe is electrically connected to the case.

4. The rotating electrical machine according to claim 1,
   wherein the side cover has a cover main body and a passage cover both made of resin,
   wherein the refrigerant passage is provided between the cover main body and the passage cover by welding the cover main body and the passage cover together, and
   wherein the plate-shaped member is made of metal, and is sandwiched between the cover main body and the passage cover.

5. The rotating electrical machine according to claim 4,
   wherein the supply ports are provided on the passage cover and face the plurality of coils in the axial direction.

6. The rotating electrical machine according to claim 4,
   wherein a part of the cover main body facing the passage cover has a recessed groove, and
   wherein the refrigerant passage is provided between the recessed groove of the cover main body and the passage cover.

7. A rotating electrical machine comprising:
   an annular stator having a rotational axis;
   a plurality of coils provided about the rotational axis;
   a case surrounding the annular stator around the rotational axis and having a side opening at one end of the case in the rotational axis;
   a side cover provided to cover the side opening to face the plurality of coils;
   a refrigerant passage provided in the side cover along a circumferential direction of the annular stator;
   supply ports to supply refrigerant from the refrigerant passage toward the plurality of coils; and
   a strainer provided inside the refrigerant passage to be erected so as to intersect with the rotational axis, the strainer having a plate-shaped member including holes to trap foreign matter in the refrigerant while the refrigerant passes through the holes.

* * * * *